United States Patent
Park et al.

(10) Patent No.: US 7,304,685 B2
(45) Date of Patent: Dec. 4, 2007

(54) DEVICE AND METHOD FOR MODIFYING VIDEO IMAGE OF DISPLAY APPARATUS

(75) Inventors: Tae Jin Park, Seongnam-si (KR); Woo Hyun Paik, Seoul-si (KR); Ick Hwan Kim, Gund-si (KR); Sang Chul Bae, Daegu (KR); Su Dong Hong, Gumi-si (KR)

(73) Assignee: LG Electronics Inc., Seoul (KR)

( * ) Notice: Subject to any disclaimer, the term of this patent is extended or adjusted under 35 U.S.C. 154(b) by 423 days.

(21) Appl. No.: 10/864,429

(22) Filed: Jun. 10, 2004

(65) Prior Publication Data

US 2004/0252238 A1 Dec. 16, 2004

(30) Foreign Application Priority Data

Jun. 13, 2003 (KR) ...................... 10-2003-0038282

(51) Int. Cl.
*H04N 5/46* (2006.01)

(52) U.S. Cl. .................. 348/556; 348/474; 348/569

(58) Field of Classification Search ................ 348/556, 348/558, 555, 445, 473, 474, 569
See application file for complete search history.

(56) References Cited

U.S. PATENT DOCUMENTS

| | | | |
|---|---|---|---|
| 5,442,403 A | * 8/1995 | Yasumoto et al. | ........ 348/432.1 |
| 5,617,147 A | * 4/1997 | Ezaki | .......................... 348/461 |
| 6,256,045 B1 | * 7/2001 | Bae et al. | .................... 348/445 |
| 6,463,210 B1 | * 10/2002 | Yokogawa | ................... 386/125 |
| 6,549,240 B1 | * 4/2003 | Reitmeier | .................... 348/459 |
| 7,106,383 B2 | * 9/2006 | Kahn | ......................... 348/556 |

FOREIGN PATENT DOCUMENTS

JP       2001-285748       10/2001

* cited by examiner

*Primary Examiner*—Michael H. Lee
(74) *Attorney, Agent, or Firm*—Birch, Stewart, Kolasch & Birch, LLP

(57) ABSTRACT

A device and method for modifying a video image of a display apparatus method, for efficiently modifying a size and aspect ratio of a video image, is disclosed. The device includes an on-screen display (OSD) generator providing an on-screen display (OSD) on a display for programming a size and an aspect ratio of a video image, and a video processor modifying a displayed video image in accordance with the size and aspect ratio of the displayed video image programmed by a user. Herein, the video processor modifies the video image from a center point of the video image.

9 Claims, 5 Drawing Sheets

FIG. 4

| Program Schedule Guide | | ABC News 6:00pm~6:30pm | | ABC February 15 |
|---|---|---|---|---|
| ▶ 02/15(Sat) | | 6:00 pm | 7:00 pm | |
| DTV | 21-2 | ABC News | Seinfeld | |
| DTV | 21-3 | ▼ That 70's Show | | ▲ |
| CNN | | CNN | | ▲ |
| NBC | | NBC News | Dateline | ▲ |
| FOX | | Hardball | Star Trek | |

FIG. 5A

| Video Image Modifying Menu | | |
|---|---|---|
| 1 | Size Control ▶ | Zoom |
| 2 | Ratio Control ▷ | User Specific |
| 3 | Normal Mode | |
| 4 | Miscellaneous | |

FIG. 5B

| Video Image Modifying Menu | | |
|---|---|---|
| 1 | Size Control ▷ | |
| 2 | Ratio Control ▶ | 2.35 : 1 |
| 3 | Normal Mode | 4 : 3 |
| 4 | Miscellaneous | 16 : 9 |
| | | User Specific |

DEVICE AND METHOD FOR MODIFYING VIDEO IMAGE OF DISPLAY APPARATUS

CROSS-REFERENCE TO RELATED APPLICATIONS

This application claims the benefit of Korean Application No. P2003-038282, filed on Jun. 13, 2003, which is hereby incorporated by reference as if fully set forth herein.

BACKGROUND OF THE INVENTION

1. Field of the Invention

The present invention relates to a display apparatus, and more particularly, to a device and method for modifying a video image of a display apparatus. Although the present invention is suitable for a wide scope of applications, it is particularly suitable for efficiently modifying a size and aspect ratio of a displayed video image.

2. Discussion of the Related Art

In the recent technology, one of the functions of a television receiver required during the analog-to-digital transition process of the television environment is the function of enlarging or reducing an inputted video image and modifying an aspect ratio of the inputted video image. For example, a wide television receiver having a picture ratio of 16:9 requires a wide range of video aspect ratios corresponding to various optional modes, such as a normal mode (i.e., a video aspect ratio of 4:3) and a wide mode (i.e., a video aspect ratio of 16:9).

Such optional modes including the normal mode (i.e., video aspect ratio of 4:3) and the wide mode (i.e., video aspect ratio of 16:9) are required because the conventional analog televisions include a television type having a video aspect ratio of 4:3 and another type having a video aspect ratio of 16:9. In other words, since each television has a fixed video aspect ratio, the conventional television is unable to efficiently display broadcast programs having different video aspect ratios.

More specifically, the related art television has some disadvantages in displaying moving pictures, such as movies. High picture quality movies are formed to have a video aspect ratio of 2.35:1. Accordingly, high picture quality images are horizontally longer than the 16:9 wide screen provided in television screens or DVD screens. Therefore, a process of modifying the image having an aspect ratio of 2.35:1 to an image having a video aspect ratio of 16:9. In addition, in televisions having a 4:3 video aspect ratio, a process of modifying the image having the video aspect ratio of 2.35:1 to a 4:3 video image is required. Similarly, when modifying a 2.35:1 video image to either a 4:3 video image or a 16:9 video image, either the left and right portions of the original video image are cropped or a black screen is inserted on upper and lower portions of the video image. Therefore, in order to support all of the various types of movie or motion picture contents distributed in the market or being broadcasted on television, a more enhanced and improved video image controlling function is required and should be developed.

SUMMARY OF THE INVENTION

Accordingly, the present invention is directed to a device and method for modifying a video image of a display apparatus that substantially obviates one or more problems due to limitations and disadvantages of the related art.

An object of the present invention is to provide a device and method for modifying a video image of a display apparatus that can modify the size and the aspect ratio of a video image currently being displayed.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a device for modifying a video image of a display apparatus including an on-screen display (OSD) generator providing an on-screen display (OSD) on a display for programming a size and an aspect ratio of a video image, and a video processor modifying a displayed video image in accordance with the size and aspect ratio of the displayed video image programmed by a user. Herein, the video processor modifies the video image from a center point of the video image.

The device for modifying a video image of a display apparatus further includes a tuner selecting broadcast signals, a digital video decoder decoding a digital video signal among the selected broadcast signals and transmitting the decoded digital video signal to the video processor, and an analog video decoder decoding an analog signal among the selected broadcast signals and transmitting the decoded analog signal to the video processor.

In another aspect of the present invention, a method for modifying a video image of a display apparatus includes displaying an on-screen display (OSD) for programming a size and an aspect ratio of a video image, programming one of a video size and a video aspect ratio from the on-screen display (OSD), and modifying a displayed video image in accordance with one of the programmed video size and the programmed video aspect ratio.

Herein, the modifying a displayed video image in accordance with one of the programmed video size and the programmed video aspect ratio does not modify a size and aspect ratio of the on-screen display (OSD).

In another aspect of the present invention, a device for modifying a video image of a display apparatus includes a demultiplexer dividing received broadcast signals into a video signal, an audio signal, and supplementary information, a video processor converting the video signal received from the demultiplexer into a displayable signal, and a microcomputer controlling the video processor so as to adjust a size and aspect ratio of a displayed video image based on the supplementary information received from the demultiplexer.

Herein, the microcomputer adjusts the size and aspect ratio of a displayed video image based on a genre information included in broadcast programs.

The device for modifying a video image of a display apparatus further includes a memory storing a video size value and a video aspect ratio value corresponding to each genre of broadcast programs, and a data processor providing a video image modifying menu for programming and storing a video size and a video aspect ratio for each genre of broadcast programs.

Herein, the video image modifying menu includes an item for programming a position of subtitles, and an item for changing a color of upper and lower portions of the displayed video image initially shown as a black screen.

In a further aspect of the present invention, a method for modifying a video image of a display apparatus includes dividing received broadcast signals into a video signal, an audio signal, and supplementary information, and converting the video signal for adjusting a size and aspect ratio of a displayed video image based on a genre information of broadcast programs included in the supplementary information.

Herein, the method for modifying a video image of a display apparatus further includes displaying a video image modifying menu for programming and storing a video size and a video aspect ratio for each genre of broadcast programs, and programming and storing a video size and a video aspect ratio for each genre of broadcast programs.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 4 illustrates an example of an Electronic Program Guide (EPG) according to the present invention; and FIGS. 5A and 5B illustrate examples of a menu for modifying video images.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

FIRST EMBODIMENT

Figure 1:
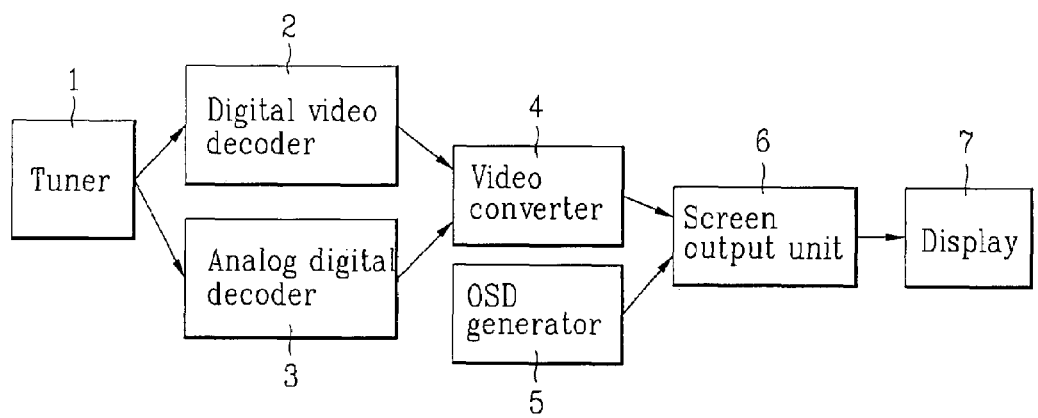
FIG. 1 illustrates a block diagram of a display apparatus according to a first embodiment of the present invention.

FIG. 1 illustrates the structure of a television receiver according to the present invention. Although the first embodiment of the present invention is illustrated as the television receiver, as shown in FIG. 1, the first embodiment of the present invention is not limited only to a television receiver but can also include other types of display apparatuses, such as personal computers (PC), mobile phones, personal digital assistants (PDA), and so on.

Referring to FIG. 1, the display apparatus according to the first embodiment of the present invention includes a combined analog-digital tuner 1 tuning analog broadcast signals and digital broadcast signals, a digital video decoder 2 decoding digital broadcast signals outputted from the combined analog-digital tuner 1, an analog video decoder 3 decoding analog broadcast signals outputted from the combined analog-digital tuner 1, a video processor 4 modifying the decoded video signals decoded from the digital video decoder 2 and the analog digital decoder 3 in accordance with a resolution of a display 7 and a video aspect ratio desired by the user, and on-screen display (OSD) generator 5 providing an on-screen display (OSD) for controlling the size of a video image being displayed, and a screen output unit 6 providing the video signals formed in the video processor 4 and an OSD image generated in the OSD generator 5 to the display 7.

The method for modifying a screen by using the screen modifying device according to the present invention having the above-described structure will now be described in detail.

Figure 2A:
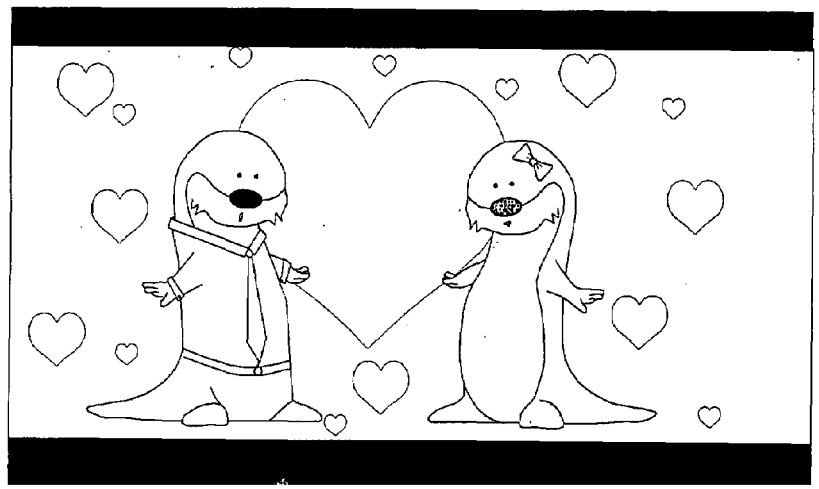
FIGS. 2A to 2C illustrate examples of modifying a video image according to the present invention.

The tuner 1 receives broadcast signals of a channel selected by the user through an antenna, a set-top box or cable receiver. Then, the digital video decoder 2 or the analog video decoder 3 decodes the received broadcast signals. The video processor 4 modifies the decoded broadcast signals received from one of the digital video decoder 2 and the analog digital decoder 3 to a displayable video signal in accordance with a predetermined resolution and video aspect ratio. Subsequently, the screen output unit 6 receives the video signal outputted from the video processor 4 and provides the video signal to the display, as shown in FIG. 2A. FIG. 2A illustrates a video image being displayed when the video aspect ratio is 16:9. In this case, a black screen is formed on both the upper and lower portion of the screen.

Figure 2B:
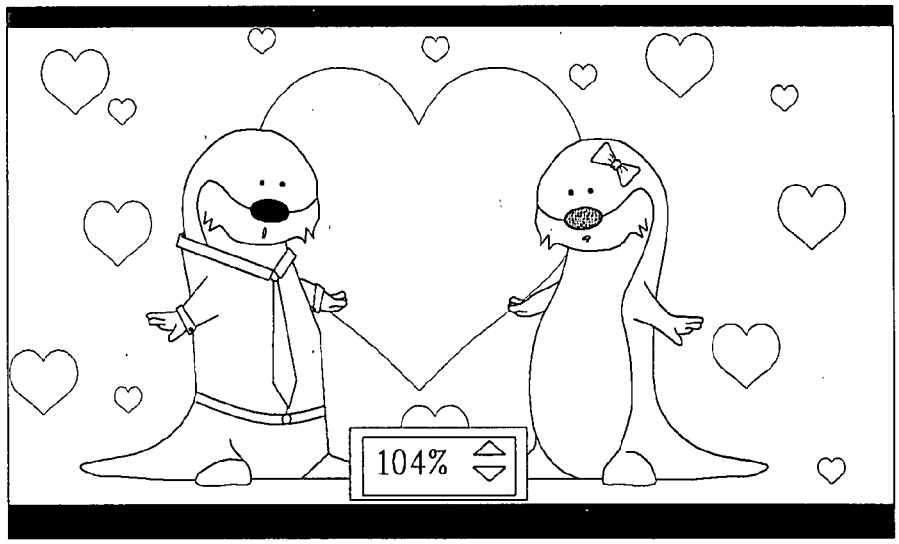
Figure 2C:
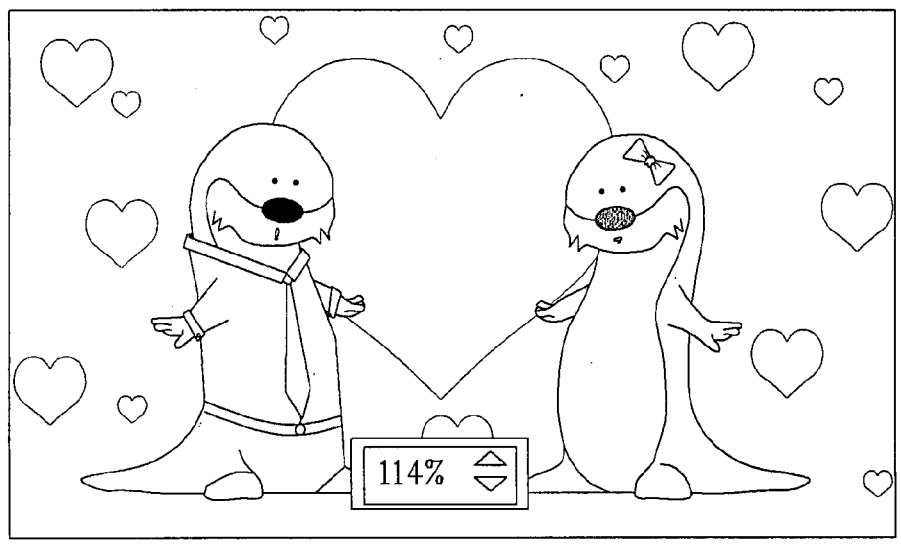

When the user desires to control the size and ratio of the displayed video image, the user can modify the size and ratio by using the control keys of a remote controller or by using the "Video Image Modifying Menu", as shown in FIGS. 5A and 5B. The remote controller includes a zoom control key, a normal mode (4:3) key, a wide mode (16:9) key, and a spectacle control key. When the user selects any one of the control keys, the OSD generator 5 displays an OSD corresponding to the user-selected control key on the display 7. For example, as shown in FIGS. 2B and 2C, if the user selects the zoom control key, the OSD generator 5 displays an OSD for controlling the size of the video image on the display 7. Subsequently, the user uses the direction control keys on the remote controller to select the enlargement ratio for modifying the size of the video image. The user can control the size of the image while verifying the changes in the size of the image displayed on the screen.

The video processor 4 converts broadcast signals to video images in accordance with the user-specified video image size or video image ratio. More specifically, depending upon the size and ratio of the video image desired by the user, the length, width, and length-width ratio of the video image are modified. At this point, the video processor 4 enlarges or reduces the size of the video image and modifies the video image ratio starting from the center point of the image or screen. Even though the size and ratio of the video image are modified, the size or shape of the OSD provided from the OSD generator 5 remains unchanged.

SECOND EMBODIMENT

Figure 3:
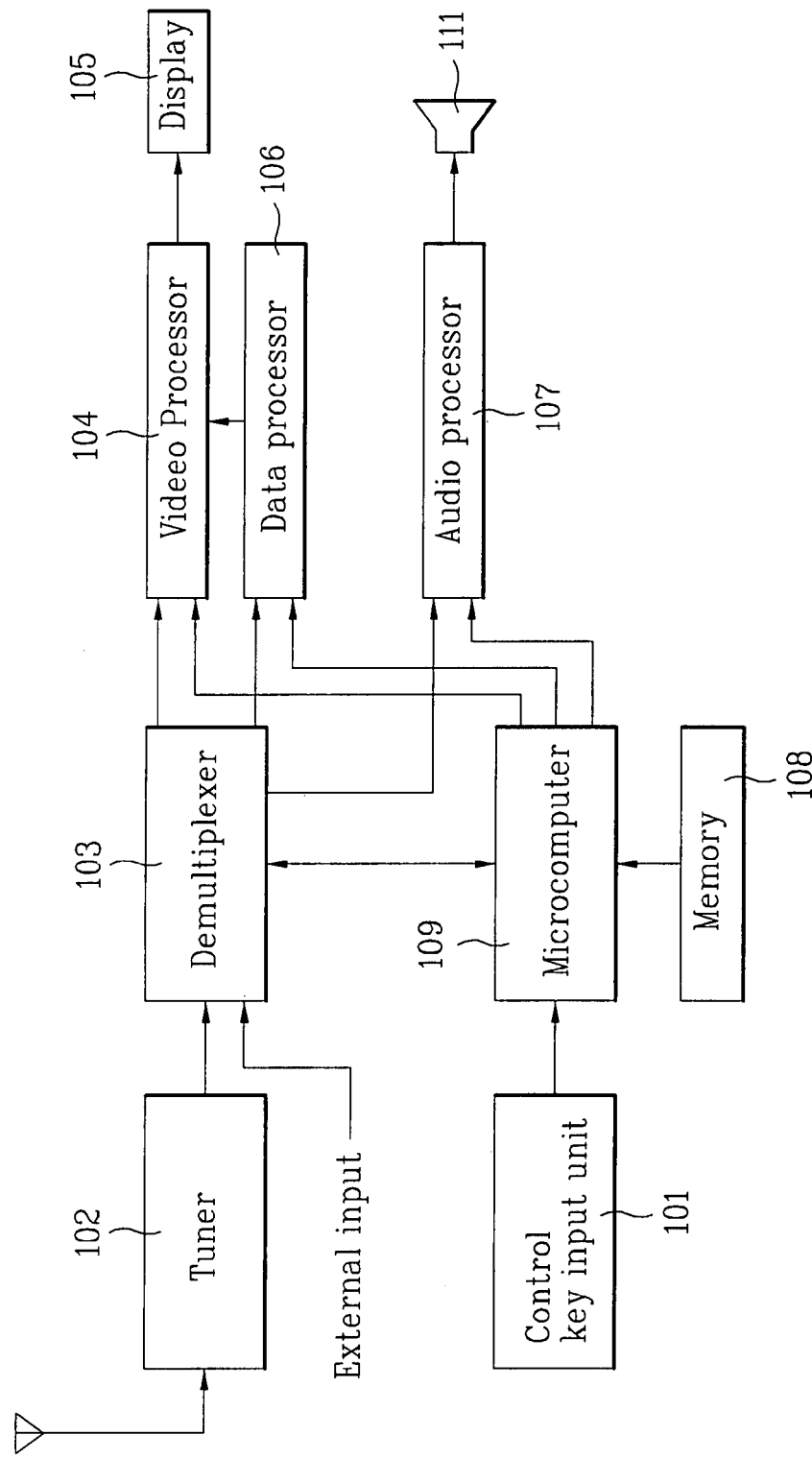
FIG. 3 illustrates a block diagram of a display apparatus according to a second embodiment of the present invention.

FIG. 3 illustrates a block diagram of a display apparatus according to a second embodiment of the present invention.

Referring to FIG. 3, a tuner 102 receives broadcast signals of a channel selected by the user through an antenna, a set-top box or cable receiver. Then, a demultiplexer (DE- MUX) 103, which is a signal divider, divides the received broadcast signals into a video signal, an audio signal, and supplementary information.

The supplementary information includes a Program Association Table (PAT), Time Date Table (TDT)/Time Offset Table (TOT), and an Event Information Table (EIT). The PAT includes information on a plurality of programs, such as information on the program genre, and TDT/TOT includes the time information for each program. And, the EIT includes information on title, synopsis, rating, start/end time, and broadcast time of the programs. Additionally, the supplementary information also includes subtitle data.

A data processor 106 receives the supplementary information from the DEMUX103, stores the supplementary information in a memory 108 to a predetermined format, and then provides the supplementary information to a video processor 104 in accordance with a command given by the user or a microcomputer 109. Also, the data processor 106 provides an OSD signal to the video processor 104 in order to display an OSD on a display 105. The video processor 104 receives the video signals from the DEMUX 103 and receives the supplementary information and the OSD signal from the data processor 106. The video processor 104 converts the video signals, the supplementary signals, and the OSD signals to displayable signals. Also, the video processor 104 displays the video signals on the display 105. In addition, the video processor 104 also displays an Electronic Program Guide (EPG) or subtitles included in the supplementary information in accordance with the user command. An example of the EPG is illustrated in FIG. 4.

An audio processor 107 receives an audio signal from the DEMUX 103 and converts the audio signal in order to be outputted through a speaker 111. A control key input unit 101 receives a user command, which is transmitted to the microcomputer 109. Then, the microcomputer 109 controls each member part in accordance with the user command.

When the user desires to control the size and ratio of the displayed video image, the user can modify the size and ratio by using the control keys of a remote controller. As shown in FIGS. 5A and 5B, the microcomputer 109 displays a "Video Image Modifying Menu", which is an OSD for setting the size and ratio of the video image. The "Video Image Modifying Menu" includes items such as "Size Control", "Ratio Control", "Normal Mode", "Miscellaneous", and so on. For example, as shown in FIG. 5A, when the user selects the "Size Control" item, the user either uses the direction control keys on the remote controller in order to select the reduction ratio or the enlargement ratio of the image, or arbitrarily inputs the length and width of the image. Referring to FIG. 5B, when the user selects the "Ratio Control" item, the user can either select a desired aspect ratio of the image, or program a new aspect ratio as desired. Also, when the user selects the "Normal Mode" item, a normal image is displayed. Finally, when the user selects the "Miscellaneous" item, the user can change the color of the upper and lower portions of the screen, which is usually shown as a black screen. The user can also decide whether to change the size and ratio of the EPG and the OSD in accordance with the size and aspect ratio of the image. Furthermore, an option for changing the location of the subtitles being displayed is also provided herein.

Depending upon the above-described selections made by the user through the "Video Image Modifying Menu", the video processor 104 processes the video signal, the supplementary information, and the OSD signal accordingly. Since the video processor 104 can separately process the image signal, the supplementary information, and the OSD signal, the EPG or the OSD may remain unchanged while the size and aspect ratio of the image is modified.

Even when external signals are inputted to the display apparatus according to the present invention though an external apparatus, such as a VCR or a DVD, the video processor 104 can control the size and aspect ratio of the image in accordance with the user command.

Moreover, the user can use the "Video Image Modifying Menu" to program the size and aspect ratio of the video image corresponding to each genre of the broadcast programs and store the programmed sizes and aspect ratios within the memory 108. When the size and aspect ratio corresponding to each genre of the broadcast programs are stored in the memory 108, the microcomputer 109 verifies the genre information included in the supplementary information of the broadcast program and, then, automatically modifies the size and aspect ratio of the video image of the received broadcast program based on the genre information, so as to display the modified video image on the display 105.

As described above, the device and method for modifying a video image of the display apparatus according to the present invention provides a "Video Image Modifying Menu" or an OSD window displayed on the display for controlling the size and aspect ratio of the video image, thereby allowing the user to efficiently modify the size and aspect ratio of a displayed image.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A device for modifying a video image of display apparatus, comprising:
   a demultiplexer dividing received broadcast signals into a video signal, an audio signal, and supplementary information;
   a video processor converting the video signal received from the demultiplexer into a displayable signal;
   a microcomputer controlling the video processor so as to adjust a size and aspect ratio of a displayed video image based on the supplementary information received from the demultiplexer; and
   a data processor providing a video image modifying menu for allowing a user to remotely change the size and aspect ratio for a currently displayed video image.

2. The device according to claim 1, wherein the microcomputer adjusts the size and aspect ratio of a displayed video image based on a genre information included in broadcast programs.

3. The device according to claim 1, further comprising a memory storing a video size value and a video aspect ratio value corresponding to each genre of broadcast programs.

4. A device for modifying a video image of display apparatus, comprising:
   a demultiplexer dividing received broadcast signals into a video signal, an audio signal, and supplementary information;
   a video processor converting the video signal received from the demultiplexer into a displayable signal;
   a microcomputer controlling the video processor so as to adjust a size and aspect ratio of a displayed video image based on the supplementary information received from the demultiplexer; and a data processor providing a video image modifying menu for programming and storing a video size and a video aspect ratio for each genre of broadcast programs.

5. The device according to claim 4, wherein the video image modifying menu includes an item for programming a position of subtitles.

6. The device according to claim 4, wherein the video image modifying menu includes an item for changing a color of upper and lower portions of the displayed video image initially shown as a black screen.

7. A method for modifying a video image of a display apparatus, comprising:

dividing received broadcast signals into a video signal, an audio signal, and supplementary information;

converting the video signal for adjusting a size and aspect ratio of a displayed video image based on a genre information of broadcast programs included in the supplementary information; and providing a video image modifying menu for allowing a user to remotely change the size and aspect ratio for a currently displayed video image.

8. A method for modifying a video image of a display apparatus, comprising:

dividing received broadcast signals into a video signal, an audio signal, and supplementary information;

converting the video signal for adjusting a size and aspect ratio of a displayed video image based on a genre information of broadcast programs included in the supplementary information; and displaying a video image modifying menu for programming and storing a video size and a video aspect ratio for each genre of broadcast programs.

9. The method according to claim 7, further comprising programming and storing a video size and a video aspect ratio for each genre of broadcast programs.

* * * * *